United States Patent
Dunsbergen et al.

(10) Patent No.: US 10,863,432 B2
(45) Date of Patent: Dec. 8, 2020

(54) ACCESS POINT WAKE UP

(71) Applicant: Hewlett Packard Enterprise Development LP, Houston, TX (US)

(72) Inventors: Berend Dunsbergen, San Jose, CA (US); Kannan Konath, Santa Clara, CA (US); Mohd Shahnawaz Siraj, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/161,362

(22) Filed: Oct. 16, 2018

(65) Prior Publication Data
US 2020/0120597 A1    Apr. 16, 2020

(51) Int. Cl.
| | |
|---|---|
| H04W 52/02 | (2009.01) |
| G06F 1/32 | (2019.01) |
| G06F 15/78 | (2006.01) |
| H04W 4/80 | (2018.01) |
| G06F 1/3206 | (2019.01) |

(52) U.S. Cl.
CPC ...... *H04W 52/0206* (2013.01); *G06F 1/3206* (2013.01); *G06F 15/7807* (2013.01); *H04W 4/80* (2018.02)

(58) Field of Classification Search
CPC ........ G06F 1/32; G06F 1/3203; G06F 1/3206; G06F 1/3209; G06F 15/78; G06F 15/7807; G06F 1/24; G06F 1/189; G06F 1/329; G06F 1/3234; G06F 1/3243; G06F 1/3246; G06F 1/3287; G06F 1/3293; G06F 11/1441; G06F 21/81; Y02D 10/17; Y02D 10/20; Y02D 10/30; Y02D 10/40; Y02D 70/00; H04W 4/80; H04W 52/02; H04W 52/0206; H04W 52/00; H04W 52/0203; H04W 52/0251; H04W 52/0254; H04W 52/0258; H04W 52/028; H04W 52/322; H04L 12/12
See application file for complete search history.

(56) References Cited

U.S. PATENT DOCUMENTS 5,390,350 A * 2/1995 Chung ................ G06F 1/3203
713/322
8,448,001 B1 * 5/2013 Zhu ...................... G06F 1/3206
713/322
(Continued)

OTHER PUBLICATIONS

Oller I Bosch, J., "Wake-up Radio Systems : Design, Development, Performance Evaluation and Comparison to Conventional Medium Access Control Protocols for Wireless Sensor Networks", Mar. 6, 2015, https://upcommons.upc.edu/handle/2117/95668.

*Primary Examiner* — Tri H Phan
(74) *Attorney, Agent, or Firm* — Brooks, Cameron & Huebsch, PLLC

(57) ABSTRACT

Example implementations relate to an access point (AP) that can via up from power save mode via a including Bluetooth low energy (BLE) system-on-chip (SoC) within the AP. The AP can include a power source, a power reset logic component in communication with the power source, a BLE SoC, a processor, and a non-transitory memory resource instructions executable by the processor that signals the AP is in a power save mode, receives an indication, via the BLE SoC, to wake up the AP, and wake up, via the BLE SoC, the AP in response to receiving the indication.

5 Claims, 5 Drawing Sheets

(56) References Cited

U.S. PATENT DOCUMENTS

| | | | |
|---|---|---|---|
| 8,576,759 | B2 | 11/2013 | Kopikare et al. |
| 8,826,047 | B1* | 9/2014 | Zhu .................... G06F 1/3206 |
| | | | 713/300 |
| 8,830,889 | B2* | 9/2014 | Woo .................... G06F 1/3209 |
| | | | 370/311 |
| 9,622,023 | B2 | 4/2017 | Goel et al. |
| 9,888,350 | B2 | 2/2018 | Steiner |
| 10,111,161 | B2* | 10/2018 | Jung .................... H04W 8/005 |
| 2013/0219157 | A1* | 8/2013 | Lee .................... G06F 1/3206 |
| | | | 713/1 |
| 2015/0011226 | A1 | 1/2015 | De Sousa |
| 2015/0103708 | A1 | 4/2015 | Kang et al. |
| 2016/0037449 | A1* | 2/2016 | Kandhalu Raghu ....................... |
| | | | H04W 52/0209 |
| | | | 370/311 |
| 2016/0366638 | A1 | 12/2016 | Kumar |
| 2018/0092034 | A1* | 3/2018 | Huang ............. H04W 52/0229 |
| 2018/0368192 | A1* | 12/2018 | Arditti Ilitzky ....... H04L 1/0044 |
| 2019/0302861 | A1* | 10/2019 | Desai .................. G06F 11/1402 |
| 2019/0303777 | A1* | 10/2019 | Desai .................. G06F 1/3243 |
| 2020/0065278 | A1* | 2/2020 | Lukas .................... G06F 13/36 |

* cited by examiner

ACCESS POINT WAKE UP

BACKGROUND

Networking devices may send and/or receive data within a computing network. Networking devices, such as access points (APs), can connect to a wired network. A wired network can have a threshold capacity on the wired network.

DETAILED DESCRIPTION

Figure 1:
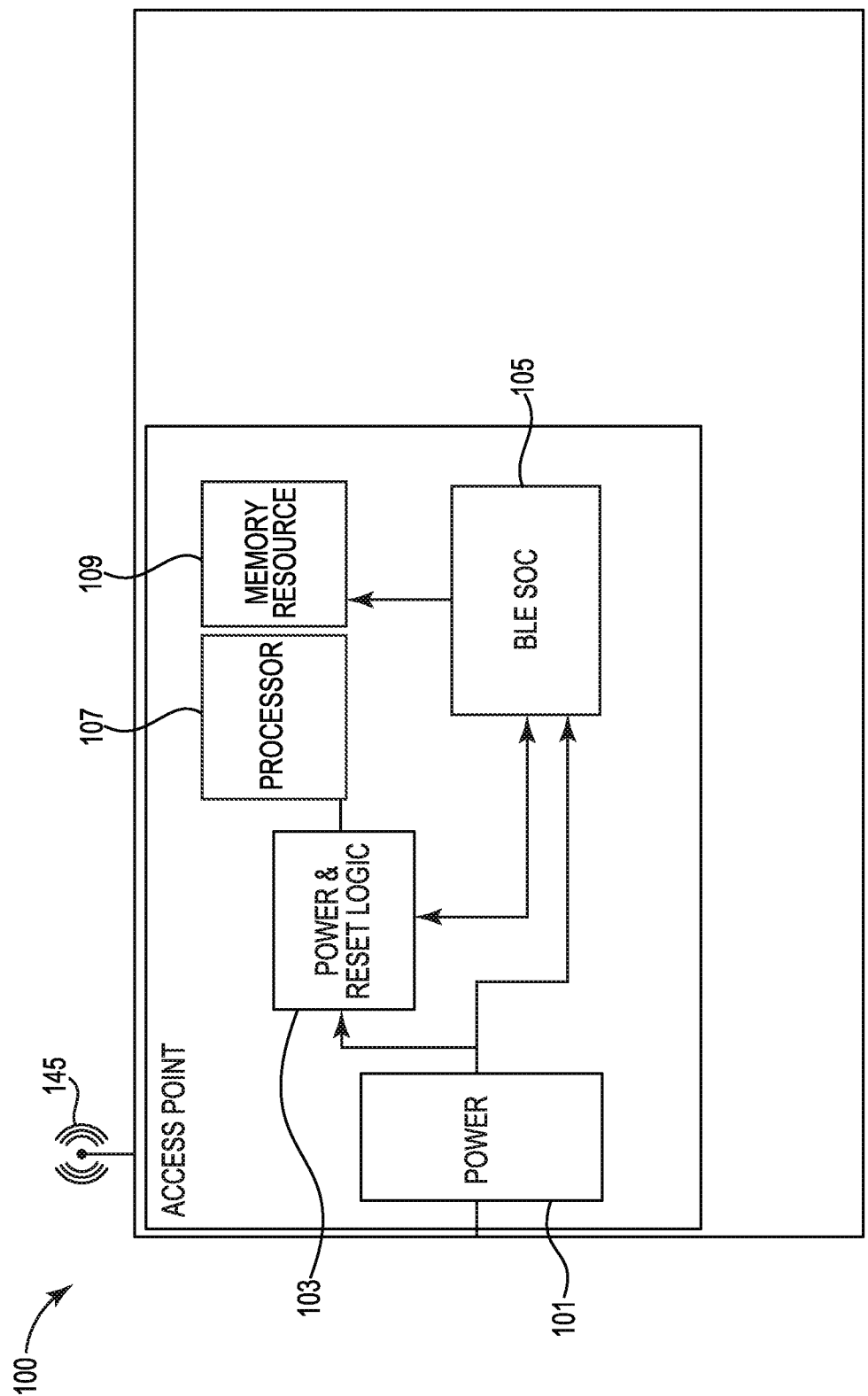
FIG. 1 illustrates an example of an access point (AP) including a Bluetooth low energy (BLE) system-on-chip (SoC) consistent with the present disclosure.

Network devices may include computing devices that are adapted to transmit and/or receive signals and to process information transmitted by the signals across a network. A network device can include a client device, an access point (AP), a controller, a management entity, and/or a data transfer device, among other devices.

As used herein, the term "information" refers to data, addresses, control, management (e.g., statistics) or any combination thereof. For transmission, information may be transmitted as a message, which may, for example, be in the form of a collection of bits in a predetermined format. One type of message, namely a wireless message, can include a header and payload data having a predetermined number of bits of information. The wireless message may be placed in a format as a plurality of packets, frames, or cells.

As described herein, the term "AP" refers to receiving points for any known or convenient wireless technology which may later become known. APs generally function as an electronic device that is adapted to allow wireless devices to connect to a wired network via various communications standards. Specifically, the term AP is not intended to be limited to IEEE 802.11-based APs. APs generally function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

In some examples, APs can support the connection of multiple wireless devices through their one wired connection. Although a single AP can consume a few watts, it can be a large number of APs that makes the increased energy consumption a concern. To save energy, APs are put into power save mode when there is no activity on the channel, and the APs can wake up again as requested. As described herein, the term "power save mode" refers to a low power mode for APs. A possible issue with waking up an AP from power save mode is a possible lack of synchronization between the stations (STA) and the APs during the power save mode. An STA is a device that has the capability to use the Institute of Electrical and Electronics Engineers (IEEE) 802.11 protocol. Examples of STAs include smart phones, laptops, physical non-virtualized computing devices, personal digital assistants, etc. In some examples, a STA may be a device that contains an IEEE 802.11-conformant media access control (MAC) and physical layer (PHY) interface to a wireless medium (WM). To avoid degradation of service for a user, a mechanism of communication with the AP in power save mode can be provided to wake up the AP and restore connectivity as new users request network access.

In some previous approaches, an AP may wake up from the power save mode via a remote device. A remote device may initiate a remote-start signal and send a remote start advertisement in response to detecting a hardware subsystem of a network device in power save mode. The remote-start advertisement powers up the hardware subsystem. However, this approach may not rapidly wake up an AP from power save mode to restore connectivity. Further, in some previous approaches, an AP may include a control module and a beacon module. The control module can operate the AP when the AP is in power save mode and may not communicate with a client station during a beacon interval. However, such previous approaches may still not rapidly wake up an AP from power save mode to restore connectivity.

Accordingly, the present disclosure describes an AP including a Bluetooth low energy system-on-chip (BLE SoC) to wake up the AP from the power save mode, via the BLE SoC. The BLE SoC can be built-in within the AP and can remain powered on when the AP is in power save mode. The AP can include a power source, and a power source reset logic component in communication with the power source. The BLE SoC can remain powered on, while the host central processing unit (CPU) and other subsystems on the AP are powered down when the AP is in power save mode. The AP can receive an indication via the BLE SoC to wake up from power save mode. The indication can be received via a timer, a mobile device, and/or an alert from an additional device, as described herein.

As described herein, the term "Bluetooth low energy" (BLE) refers to a radio transceiver that may be utilized to transmit and/or receive a radio signal from various other radio transceiver technologies. As described herein, the term "system on chip" (SoC) refers to an integrated circuit that integrates all components of the BLE. In some examples, the SoC can integrate a microcontroller, a microprocessor with advanced peripherals like graphics processing unit (GPU), Wi-Fi module, or a coprocessor. The AP can receive an indication via the BLE SoC to wake up. The indication can be received via a timer, a mobile device, and/or an alert from an additional device, as described herein.

FIG. 1 illustrates an example of an AP 100 including BLE SoC consistent with the present disclosure. AP 100 can include power source 101, power reset logic component 103, BLE SoC 105, and antenna 145. AP 100 can include a processor 107 and a memory resource 109. The memory resource 109 can be used to store instructions executable by the processor to perform a number of operations as described herein.

The AP 100 can include a power source 101, and a power reset logic component 103. The power reset logic component 103 can be in communication with the power source 101, as indicated by an arrow connecting 101 and 103. In some examples, power source 101 can include an AC/DC adapter. In some examples, power source 101 can include a Power over Ethernet (PoE) power source.

In some examples, the power source 101 can provide power to the power reset logic component 103, and the power reset logic component 103 can indicate to the BLE SoC 105 whether the AP is in power save mode. In some examples, power source 101 can directly provide power to BLE SoC 105. In some examples, BLE SoC can receive power via power reset logic component 103. Power source 101 can send power to the power reset logic component 103, which in response can communicate with the BLE SoC. In some examples, BLE SoC 105 can power up a host CPU.

In some examples, the memory resource 109 can include instructions, executable by the processor 107, to receive information from the power reset logic component 103 that indicates that the AP 100 is in power save mode. In response to receiving the information indicating the AP 100 is in power save mode, the BLE SoC 105 can send an indication to wake up the AP 100. In response to receiving the indication to wake up the AP 100, the AP 100 can be awakened via the BLE SoC 105.

In some examples, the memory resource 109 can include instructions, executable by the processor 107 to receive, via the BLE SoC 105 an indication to wake up the AP 100. AP 100 can receive an indication in response to a timer indicating to wake up the AP 100 in response to the timer reaching an elapsed amount of time. As described herein, the term "elapsed time" refers to a period of time that the AP is in the power save mode. In some examples, the timer can be activated via the BLE SoC 105.

In some examples, AP 100 can receive an indication in response to a mobile device (e.g., a smartphone, a personal digital assistant, tablet computer) indicating to wake up the AP 100 in response to detecting the AP 100 in the power save mode. The BLE SoC 105 can use a Generic Attribute Profile (GATT) for waking up the AP 100. GATT can determine the way two devices transfer data back and forth using services and characteristics. Services are used to break data up into logic entities, and contain specific chunks of data called characteristics. Characteristics are the lowest level concept in GATT transactions encapsulates a single data point.

In some examples, The AP 100 can detect an established connection between AP 100 and the mobile device through the advertising process. In some examples, a mobile application can detect the established connection between AP 100 and the mobile device and trigger the AP 100 to wakeup from the power save mode. In some examples, the mobile can device awaken the AP 100 without alerting the mobile device user.

In some examples, the memory resource 109 can include instructions, executable by the processor 107 to receive information that signals AP 100 is in power save mode. In some examples, BLE SoC 105 can advertise a special flag indicating that the AP 100 is in power save mode. For example, nearby mobile devices can include a mobile application that can monitor AP beacons from antenna 145 and alert the mobile application user when there is an AP 100 nearby that is in power save mode. In some examples, the mobile device can detect AP 100 in sleep mode and awaken AP 100-1 without sending an alert to the user.

The mobile device application can be alerted even in the background. For example, the mobile device user can get an alert that a WiFi network can be enabled. In response to the received alert, the mobile device application can connect to the AP, via the BLE SoC 105, and awaken AP 100. In some examples, the mobile device application can recover AP 100 in sleep mode that is not recovered via Wake-On-Lan (WoL). The AP 100 in sleep mode can be awakened, via the BLE SoC 105, from the power save mode.

In some examples, AP 100 can receive an indication in response to alert data being received from an additional device. The alert data can be received from the additional device in response to the additional device being unable to meet a network capacity. The additional device can comprise one of an access point, mobile application, a network device, a wireless transmitter, a network controller, or a combination thereof. As used herein, the term "controller" can, for example, refer to a network device offering centralized network engineering, Internet Protocol services, security and policy controls, and application-aware platforms. In addition to network control, the controller can also be deployed as branch gateways, virtual private network (VPN) concentrators, wireless intrusion prevention system (WIPS) or wireless intrusion detection system (WIDS), spectrum monitors, stateful network firewalls with integrated content filtering, etc. The controller can manage a plurality of APs and/or client devices associated with the APs in the Wireless Local Area Network (WLAN). As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

In some examples, AP 100 can advertise to the additional device that the AP 100 is in a power save mode. An advertisement can include a broadcast of small packets of data via a beacon frame which can include a universally unique identifier (UUID). As described herein, a beacon frame refers to one of the management frames in IEEE 802.11 based WLANs. A beacon frame can include information about a network. As described herein, an UUID is a 128-bit number used to uniquely identify some object and/or entity on the internet.

The AP 100 can receive information associated with a power status of the power source 101 associated with the AP 100. In some examples, the power status can indicate the AP is in deep sleep mode. In some examples, the power status can indicate the AP is in hibernation mode. In some examples, the power status can indicate one of working mode, sleep mode, hibernation mode, soft off mode, and mechanically off mode.

In some examples, the memory resource 109 can include instructions, executable by the processor 107, to awaken AP 100, via BLE SoC 105, in response to receiving an indication, described herein.

Figure 2:
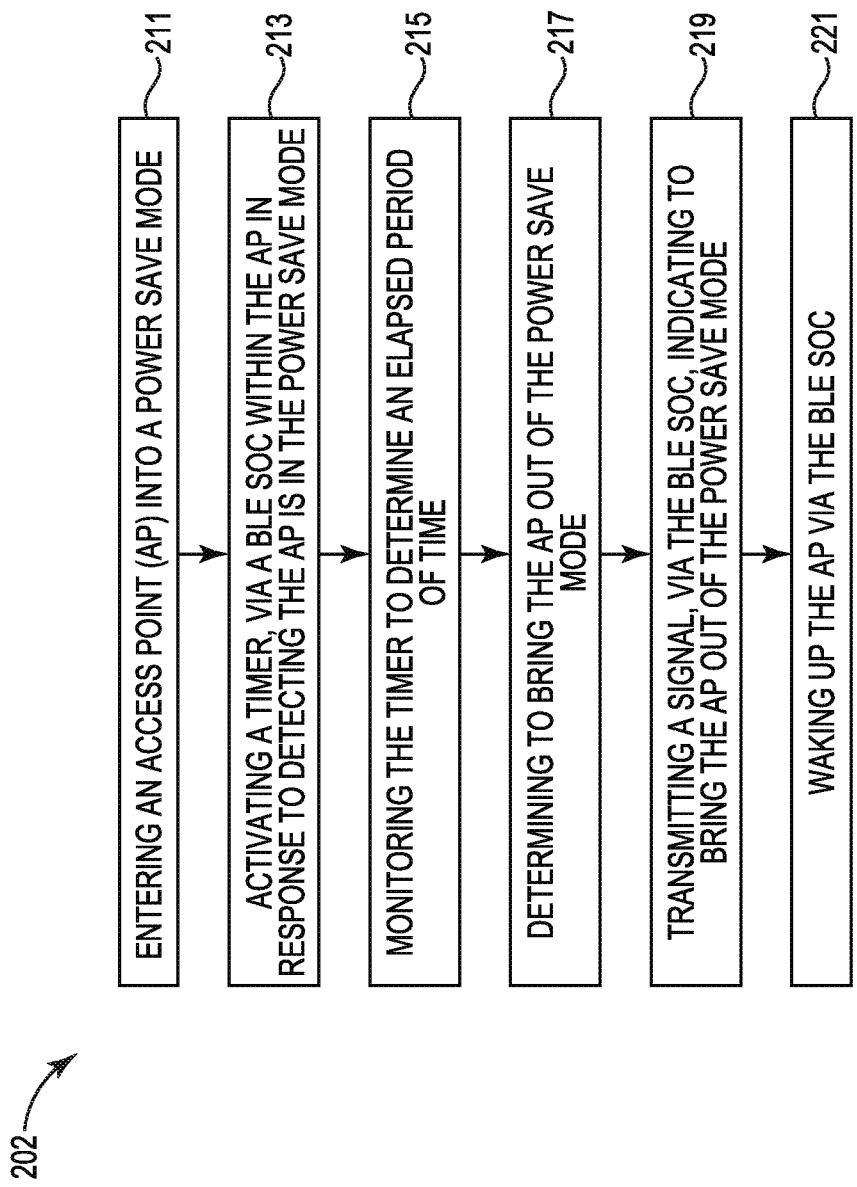
FIG. 2 illustrates a diagram of an example method for waking up an AP consistent with the present disclosure.

FIG. 2 illustrates a diagram of an example method 202 for waking up an AP (such as AP 100 in FIG. 1) consistent with the present disclosure. Method 202 may be performed by a processor (e.g., processor 107, described in connection with FIG. 1) and memory resource (e.g., memory resource 109 described in connection with FIG. 1). Method 202 can include instructions 211, 213, 215, 217, 219, and 221.

At 211, method 202 includes entering an AP into a power save mode. In some examples, the power save mode can refer to the AP being in a hibernation mode. In some examples, the power save mode can refer to the AP being in a deep sleep mode.

At 213, method 202 includes activating a timer, via a BLE SoC, within the AP in response to detecting the AP is in the power save mode. In some examples, BLE SoC can be analogous to BLE SoC 105, as described in FIG. 1. BLE SoC can be located within the AP. In some examples, a power source can directly provide power to BLE SoC. In some examples, BLE SoC can receive power via a power reset logic component.

The BLE SoC can activate a timer in response to detecting the AP is in the power save mode. For example, a trigger can be sent to activate the timer via the BLE SoC. In some examples, the timer can be programmed to activate at set time intervals. For example, the timer can be programmed to activate in response to the AP being in power save mode for more than one minute. In some examples, the timer can be programmed to activate in response to the AP being in power save mode for more than one hour. The timer can be programmed to identify actions, such as entering deep sleep mode, or hibernation mode, of the power save mode. The timer can reference the action and run at scheduled time intervals.

In some examples, the timer can be activated by a user. A user can determine that the AP is in power save mode and program the timer to activate at set time intervals. In some examples, the user can program the timer to activate at 6:00 AM based on the determination that the AP goes into the power save mode between 10:00 PM and 11:00 PM.

At 215, method 202 includes monitoring the timer to determine an elapsed period of time. The elapsed period of time can comprise a period of time that the AP is in the power save mode. In some examples, the elapsed period of time can be a minute. In some examples, the elapsed period of time can be an hour. In some examples, the elapsed period of time can be a year.

At 217, method 202 includes determining, in response to the elapsed period of time being elapsed to bring the AP out of the power save mode. In some examples, the timer can determine a period of time has elapsed and method 202 can determine to bring the AP out of the power save mode.

At 219, method 202 includes transmitting a signal, via the BLE SoC, indicating to bring the AP out of the power save mode. In response to determining that a period of time has elapsed and determining to bring the AP out of the power save mode, the BLE SoC can indicate to bring the AP out of the power save mode. In some examples, BLE SoC can transmit a signal indicating to bring the AP out of the power save mode. In some examples, BLE SoC can broadcast the signal by sending the AP's power save mode information to monitoring devices. In some examples, BLE SoC can exchange data packets between the AP and additional devices during a time interval to indicate to bring the AP out of the power save mode.

At 221, method 202 includes waking up the AP via the BLE SoC. In some examples, the AP can be in a network outside of a Wake on LAN (WoL) frame. As described herein, the term "Wake on LAN" WoL, refers to an ethernet or token ring computer networking standard that allows a computer to be turned on or awakened by a network message. In some examples, the AP that is in power save mode can be unreachable because the WoL frames cannot be transmitted to. In such instances, the AP controller can instruct a neighbouring AP to connect to it and wake up the AP. In some examples, the controller can instruct all APs to look for neighbors in power save mode and wake them up on a network wide basis.

Figure 3:
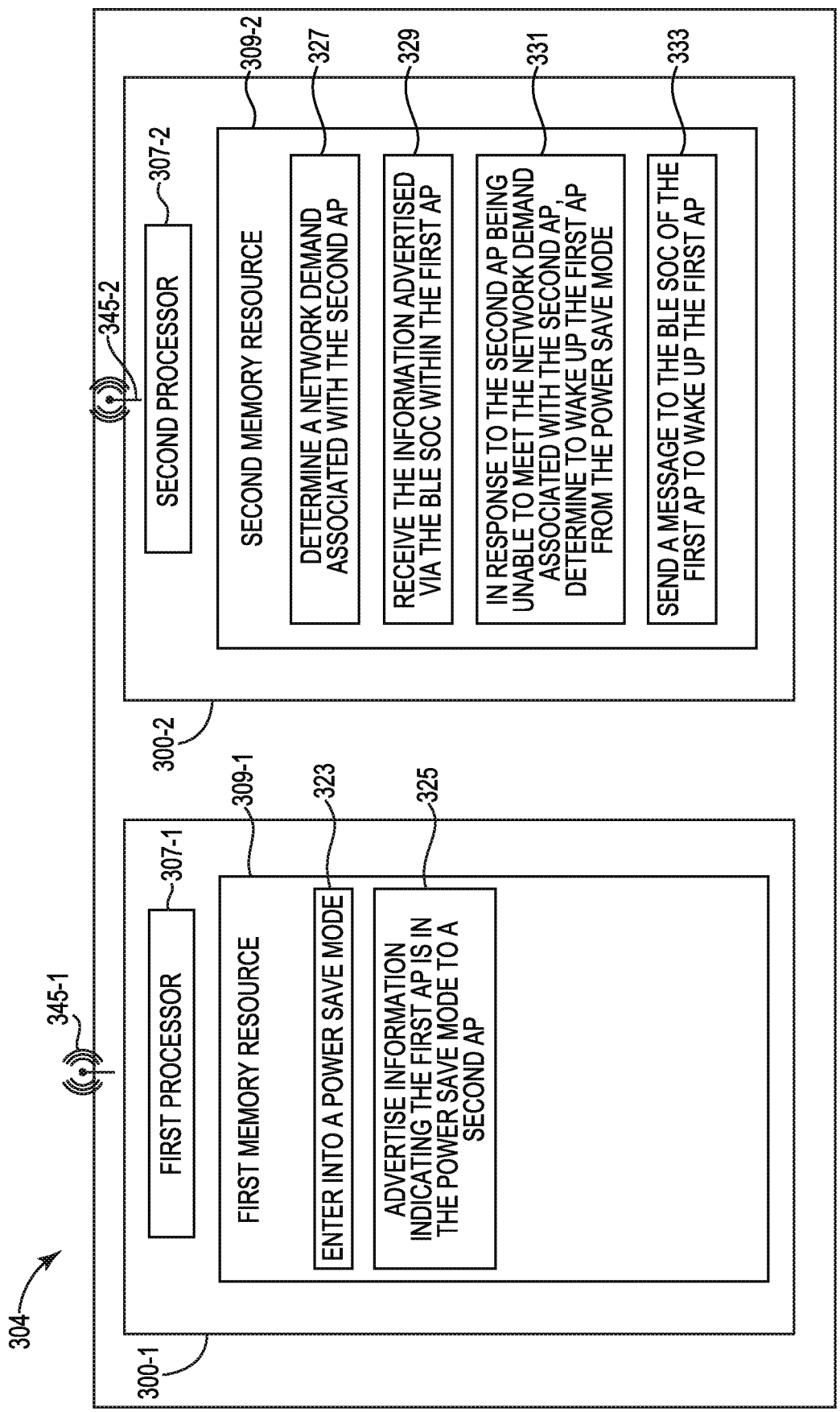
FIG. 3 illustrates an example system consistent with the present disclosure.

FIG. 3 illustrates an example system 304 consistent with the present disclosure. FIG. 3 illustrates a first AP 300-1 including an antenna 345-1 and second AP 300-2 including an antenna 345-2. The first AP 300-1 can include a first processor 307-1 and a first memory resource 309-1. The second AP 300-2 can include a second processor 307-2 and a second memory resource 309-2. The first processor 307-1 can execute instructions stored on the first memory resource 309-1. The first processor 307-1 can execute instructions 323 and 325. The second processor resource 307-2 can execute instructions stored on the second memory resource 309-2. The second processor 307-2 can execute instructions 327, 329, 331, and 333.

In some examples, the first processor 307-1 and the second processor 307-2 may be central processing units (CPUs), semiconductor-based microprocessors, and/or other hardware devices suitable for retrieval and execution of instructions stored in a memory resource 309-1, 309-2 (e.g., in a non-transitory computer readable medium). The example first processor 307-1 can execute instructions 323 and 325 to enter and advertise. The example second processor 307-2 can execute instructions 327, 329, 331, 333 to determine, receive, advertise, and send. As an alternative, or in addition to, retrieving and executing instructions, the example first processor 307-1 and second processor 307-2 can include an electronic circuit that may include electronic components for performing the functionality of executed instructions.

In some examples, first processor 307-1 and second processor 307-2 can each be a plurality of hardware processing units that may cause machine-readable instructions to be executed. The first processor 307-1 and the second processor 307-2 can each include central processing units (CPUs) among other types of processing units. The first processor 307-1 and second processor 307-2 can each be any type of volatile or non-volatile memory or storage, such as random-access memory (RAM), flash memory, storage volumes, a hard disk, or a combination thereof.

The first processor 307-1 and second processor 307-2 can each include a network device that has a wired connection to a computing network (e.g., LAN, Internet, etc.). The first AP 300-1 and the second AP 300-2 may each act as a wireless connection point for client devices. As used herein, the term "client device" can, for example, refer to a device including a processor, memory, and input/output interfaces for wired and/or wireless communication. For example, a client device may include a laptop computer, a desktop computer, a mobile device, an Internet-of-Things device and/or other wireless devices, although examples of the disclosure are not limited to such devices. A mobile device may, for example, refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

The first memory resource 309-1 of the first AP 300-1 can store instructions 323 executable by the first processor 307-1 to enter the first AP 300-1 into a power save mode. The first memory resource 309-1 of the first AP 300-1 can store instructions 325 executable by the first processor 307-1 to advertise information indicating the first AP 300-1 is in the power save mode to a second AP 300-2. In some examples, the advertised information is sent via a BLE SoC within the first AP 300-1. In some examples, the BLE SoC can be analogous to BLE SoC 105, as described in FIG. 1, herein. In some examples, AP 300-1 is analogous to AP 100, as described in FIG. 1, herein. In some examples, AP 300-1 can advertise power status flag (e.g., sleep, starting, awake) indicating whether the AP is power save mode, in the process of waking up, or fully awake and ready for service respectively.

In some examples, the second AP 300-2 can receive and/or transmit advertisement information. In some examples, information associated with the advertisement can be transmitted as a broadcast message and/or a unicast message. In some examples, the second AP 300-2 can be activated in response to determining the first AP 300-1 is in the power save mode. The second AP 300-2 of system 304 can be controlled via a network controller. The controller can perform load balancing operations of the second AP 300-2.

The second memory resource 309-2 of the second AP 300-2 can store instructions 327 executable by the second processor 307-2 to determine a network demand associated with the second AP 300-2. In some examples, the network demand can be high, and the second AP 300-2 may be unable to meet the demand associated with the second AP 300-2. As described herein, high demand can refer to a demand that is close to, or exceeds the resources available to meet the demand of an AP. In some examples, the second AP 300-2 can advertise a flag (help) indicating when the load of Wi-Fi clients is high and wants some help offloading Wi-Fi to its neighboring APs. The BLE SoC of the first AP can listen to the advertisement sent by the second AP 300-2 and can bring AP 300-1 out of the sleep mode to help AP 300-2 off load. In some examples, the determination of the network demand is based on information broadcasted by the second processor 307-2 associated with the second AP 300-2 to the first AP 300-1.

The second memory resource 309-2 of the second AP 300-2 can store instructions 329 executable by the second processor 307-2 to receive the information advertised via the BLE SoC within the first AP 300-1. In some examples, information advertised via the BLE SoC within the first AP can include a payload of the first AP 300-1 advertisement data packet. As described herein, the term "payload" refers data that is being carried within a data packet or other transmission unit. In some examples, information received by second AP 300-2 can include the existence of other APs and/or radios through received frames (e.g., received 802.11 frames) such as beacons, probe responses, etc.

The second memory resource 309-2 of the second AP 300-2 can store instructions 329 executable by the second processor 307-2 to receive the information advertised via the BLE SoC within the first AP 300-1. In some examples, the information advertised can be transmitted as a broadcast message. In some examples, the information advertised can be transmitted as a unicast message. In some examples, the second AP 300-2 can include a second BLE-SoC to receive the information advertised via the BLE SoC within the first AP 300-1.

The second memory resource 309-2 of the second AP 300-2 can store instructions 331 executable by the second processor 307-2 to determine to wake up the first AP 300-1 from the power save mode in response to the second AP 300-2 being unable to meet the demand associated with the second AP.

The second memory resource 309-2 of the second AP 300-2 can store instructions 331 executable by the second processor 307-2 to send a message to the BLE SoC of the first AP 300-1 to wake up the first AP 300-1. In some examples, the first AP 300-1 can wake up via activation of a subsystem within the first AP 300-1. The subsystems can include radios, Wi-Fi radios, flash memory, random access memory (RAM), or a combination thereof.

Figures 4A, 4B:
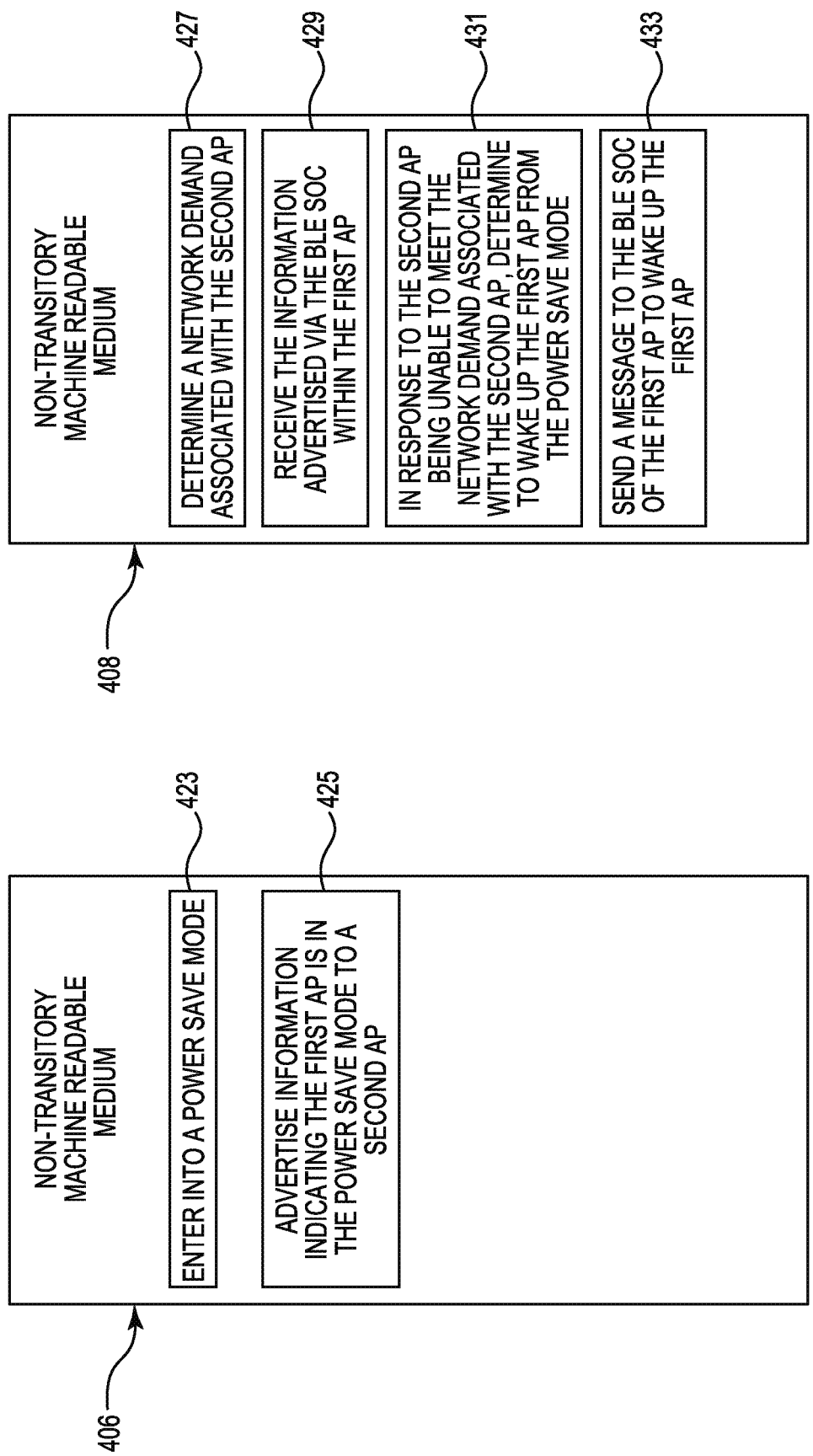
FIG. 4A illustrates a diagram of an example of a non-transitory machine readable medium consistent with the present disclosure.
FIG. 4B illustrates a diagram of an example of a non-transitory machine readable medium consistent with the present disclosure.

FIG. 4A illustrates a diagram of an example of a first non-transitory machine readable medium 406 consistent with the present disclosure. The first non-transitory machine readable medium 406 can execute instructions 423 and 425 via a processor (not illustrated). A processor (such as processor 307-1 in FIG. 3) can execute instructions stored on the non-transitory machine readable medium 406. The non-transitory machine readable medium 406 can be any type of volatile or non-volatile memory or storage, such as random access memory (RAM), flash memory, read-only memory (ROM), storage volumes, hard disk, or a combination thereof.

The example medium 406 can store instructions 423 executable by a processor to determine to enter an AP (such as AP 300-1 in FIG. 3) into a power save mode. The example medium 406 can store instructions 425 executable by a processor to advertise information indicating the first AP (such as AP 300-1 in Figure) is in the power save mode to a second AP. In some examples, the advertised information is sent via a BLE SoC within the first AP 300-1. In some examples, the BLE SoC can be analogous to BLE SoC 105, as described in FIG. 1, herein.

The example medium 406 can store instructions 425 executable by a processor to receive an advertisement from the second AP in response to detecting the first AP is in the power save mode. In some examples, the first AP can advertise a power status flag (e.g., sleep, starting, awake) indicating whether the AP is in power save mode, in the process of waking up, or fully awake and ready for service, respectively.

FIG. 4B illustrates a diagram of an example of a second a non-transitory machine readable medium 408 consistent with the present disclosure. The second non-transitory machine readable medium 408 can execute instructions 427, 429, 431 and 431 via a second processor (not illustrated). The second processor (such as processor 307-2 in FIG. 1) can execute instructions stored on the non-transitory machine readable medium 408.

The example medium 408 can store instruction 427 executable by a second processor (such as processor 307-2 in FIG. 3) to determine a network demand associated with a second AP (such as AP 300-2 in FIG. 3). In some examples, the network demand can be high, and the second AP may be unable to meet the demand associated with the second AP. In some examples, the second AP may need to off load Wi-Fi to its neighboring AP. In some examples, the determination of the network demand is based on information broadcasted by the second processor associated with the second AP the first AP. At instruction 427 the second processor can execute instruction to receive information advertised via the BLE SoC within the first AP.

The example medium 408 can store instruction 429 executable by the second processor to receive the information advertised via the BLE SoC within the first AP 300-1. In some examples, the information advertised can be transmitted as a broadcast message. In some examples, the information advertised can be transmitted via a unicast message. In some examples, the second AP can include a second BLE-SoC to receive the information advertised via the BLE SoC within the first AP. The example medium 408 can store instruction 431 executable by the second processor to determine to wake up the first AP from the power save mode in response to the second AP being unable to meet the demand associated with the second AP.

The example medium 408 can store instruction 433 executable by the second processor to send a message to the BLE SoC of the first AP to wake up the first AP. In some examples, the first AP can wake up via activation of a subsystem within the first AP. The subsystems can include radios, Wi-Fi radios, flash memory, random access memory (RAM), or a combination thereof.

Figure 5:
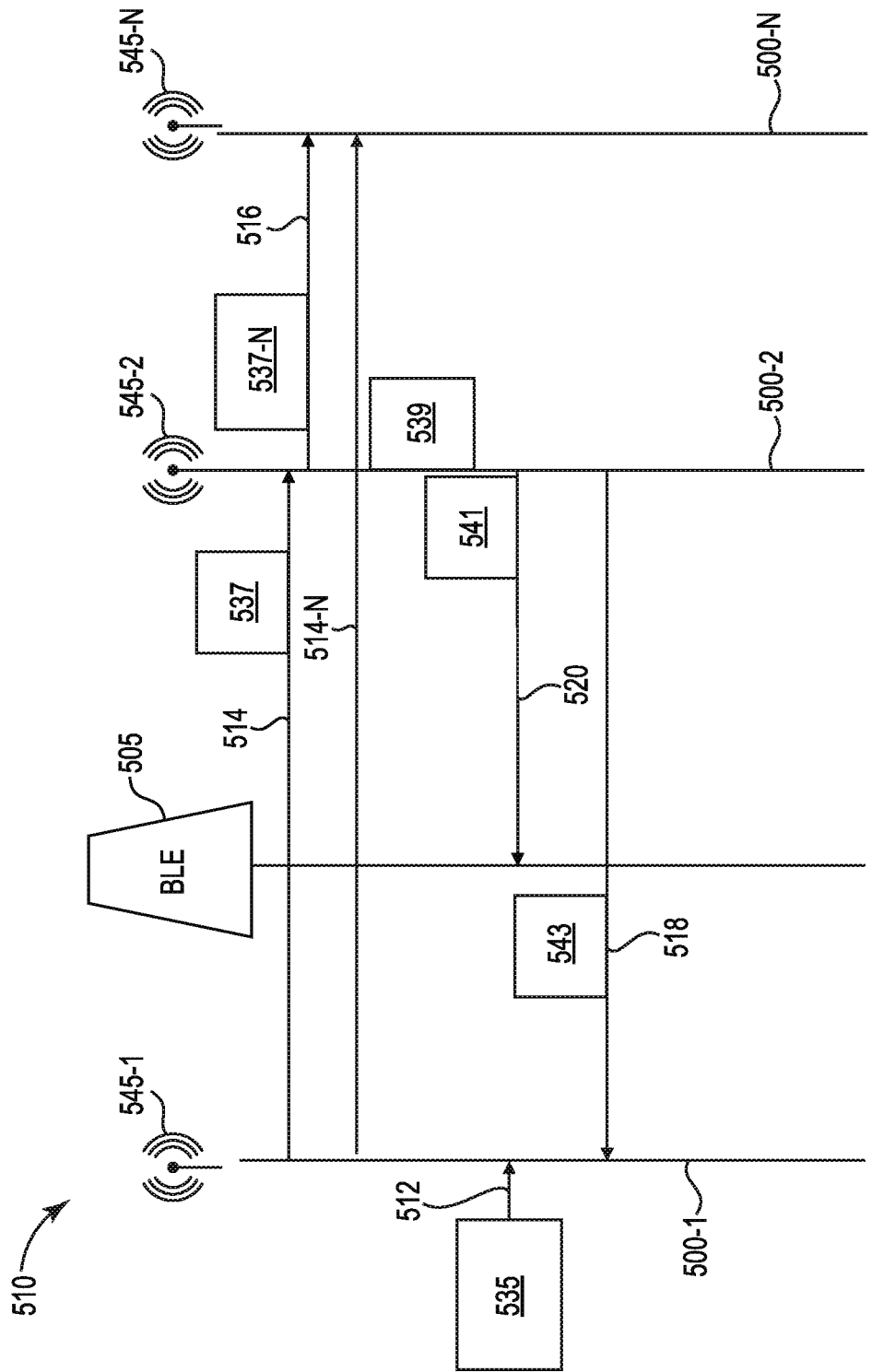
FIG. 5 illustrates an example AP-to-AP message flow consistent with the present disclosure.

FIG. 5 illustrates an example AP-to-AP message flow 510 consistent with the present disclosure. Flow 510 can include a first AP 500-1, a second AP 500-2, a neighboring AP 500-N, and a BLE SoC 505. The first AP 500-1 can include an antenna 545-1, the second AP 500-2 can include an antenna 545-2, and the neighboring AP 500-N can include an antenna 545-N. Flow 510 can include instructions 535, 537, 539, 541, and 543.

In some examples, instruction 535 is performed by AP 500-1 to enter the first AP 500-1 into power save mode, indicated by arrow 512. AP 500-1 can receive the power save mode instruction 535 via a power reset logic component within the AP 500-1. The power reset logic component can be in communication with a power source. The power source, and the power reset logic component can be analogous to power source 101 and, power reset logic component 103 as described in FIG. 1, herein.

In some examples, instruction 537 is performed by first AP 500-1 performing the instruction on second AP 500-2, as indicated by arrow 514. Instruction 537 can include instruction to advertise information indicating the first AP 500-1 is in the power save mode to the second AP 500-2. The advertised information from the first AP 500-1 can be sent via BLE SoC 505 within the first AP 500-1. In some examples, the second AP 500-2 can be activated in response to determining the first AP 500-1 is in the power save mode.

In some examples, the instruction 537-N is performed by the first AP 500-1 performing the instruction on a neighboring AP 500-N, as indicated by arrow 514-N. In some examples, instruction 537-N is performed by the second AP 500-2 performing the instruction on neighboring AP 545-N, as indicated by arrow 516. Instruction 537 can include instructions to transmit the advertisement information from AP 500-2 to AP 545-N.

In some examples, instruction 539 is performed on the second AP 500-2 to determine a network demand associated with the second AP 500-2. In some examples, the network demand can be high, and the second AP 500-2 may be unable to meet the demand associated with the second AP 500-2. In some examples, the second AP 500-2 may need to off load Wi-Fi to its neighboring AP 500-N.

In some examples, the instruction 543 is performed by the second AP 500-2 on the first AP 500-1 performing the instruction to awaken the first AP 500-1 from the power save mode, as indicated by arrow 518. Second AP 500-2 can perform instruction 541 in response to the second AP 500-2 being unable to meet the demand associated with the second AP 500-2. In some examples, instruction 541 is performed by the second AP 500-2 performing the instruction on first AP 500-1 to send a message to the BLE SoC 505 to awaken the first AP 500-1, as indicated by arrow 520.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. An access point (AP), comprising:
   a power source;
   a power reset logic component in communication with the power source;
   a Bluetooth low energy (BLE) system-on-chip (SoC) in communication with the power source and the power reset logic component;
   a processor; and
   a memory resource storing machine readable instructions executable by the processor to:
   receive, from the power reset logic component, information that signals the AP is in a power save mode;
   receive, via the BLE SoC, an indication to wake up the AP, wherein the indication is received in response to one of: a timer indicating to wake up the AP in response to the timer reaching an elapsed amount of time, or a mobile device indicating to wake up the AP in response to detecting the AP in the power save mode, or an alert data received from an additional device in response to the additional device being unable to meet a network capacity;
   wherein the AP advertises to the additional device that the AP is in the power save mode, wherein the advertisement includes broadcasting small packets of data via a beacon frame which includes a universally unique identifier (UUID); and
   wake up, via the BLE SoC, the AP in response to receiving the indication.

2. The AP of claim 1, wherein the additional device comprises one of an access point, mobile application, a network device, a wireless transmitter, a network controller or combination thereof.

3. The AP of claim 1, wherein the AP receives information associated with a power status of the power source associated with the AP.

4. The AP of claim 1, wherein the BLE SoC is powered via the power source.

5. The AP of claim 1, wherein the BLE SoC is located within the AP.

* * * * *